(12) United States Patent
Chu et al.

(10) Patent No.: US 9,654,397 B2
(45) Date of Patent: May 16, 2017

(54) METHOD FOR LOOKING UP DATA IN HASH TABLES AND ASSOCIATED NETWORK DEVICE

(71) Applicant: MediaTek Inc., Hsin-Chu (TW)

(72) Inventors: Chun-Yuan Chu, Taipei (TW);
Chun-Hung Chen, Taichung (TW);
Shu-Ping Lin, New Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 91 days.

(21) Appl. No.: 14/657,007

(22) Filed: Mar. 13, 2015

(65) Prior Publication Data
US 2016/0269290 A1 Sep. 15, 2016

(51) Int. Cl.
*H03M 7/00* (2006.01)
*H04L 12/745* (2013.01)
*H04L 12/773* (2013.01)
*H04L 12/743* (2013.01)

(52) U.S. Cl.
CPC ............ *H04L 45/748* (2013.01); *H04L 45/60* (2013.01); *H04L 45/7453* (2013.01)

(58) Field of Classification Search
CPC ....... H04L 12/743; H04L 29/06; H04L 12/56; H04L 12/745; H04L 45/60; H04L 45/748; G06F 15/16; G01R 31/08
See application file for complete search history.

(56) References Cited

U.S. PATENT DOCUMENTS

| | | | |
|---|---|---|---|
| 6,222,840 B1* | 4/2001 | Walker ................. | H04L 49/351 370/360 |
| 8,681,819 B2* | 3/2014 | Abel ....................... | H04L 69/22 370/252 |
| 2007/0115986 A1* | 5/2007 | Shankara .............. | H04L 63/145 370/392 |
| 2009/0234908 A1* | 9/2009 | Reyhner ................ | G06F 9/546 709/203 |
| 2014/0334491 A1* | 11/2014 | Pazhayakath .......... | H04L 45/38 370/392 |
| 2015/0098470 A1* | 4/2015 | Sun ....................... | H04L 45/748 370/392 |
| 2015/0124825 A1* | 5/2015 | Dharmapurikar ... | H04L 45/7453 370/392 |
| 2015/0341473 A1* | 11/2015 | Dumitrescu ........... | H04L 69/22 370/392 |
| 2016/0112319 A1* | 4/2016 | Hasani .................. | H04L 45/748 370/392 |

* cited by examiner

*Primary Examiner* — Mohamed Kamara
(74) *Attorney, Agent, or Firm* — McClure, Qualey & Rodack, LLP (57) ABSTRACT

A network device is provided. The network device includes: a hash memory and a controller. The hash memory has a plurality of hash tables, wherein each hash table includes a plurality of entries, and each entry in each hash table has a signature field, and a key field. The controller is configured to map a search key to a plurality of entries of the hash tables and perform longest prefix matching (LPM) on the search key based on the signature field and the key field of each mapped entry in the mapped hash tables.

22 Claims, 6 Drawing Sheets

METHOD FOR LOOKING UP DATA IN HASH TABLES AND ASSOCIATED NETWORK DEVICE

BACKGROUND OF THE INVENTION

Field of the Invention

The invention relates to a network device, and in particular, to a network device applying a hash memory architecture supporting longest prefix matching (LPM).

Description of the Related Art

As the number of devices connected to data networks increases and higher data rates are required, there is a growing need for new technologies that enable higher transmission rates. In this regard, various efforts exist, including technologies that enable transmission rates that may even exceed Gigabits-per-second (Gbps) data rates. For example, the IEEE 802.3 standard defines the (Medium Access Control) MAC interface and physical layer (PHY) for Ethernet connections at 10 Mbps, 100 Mbps, 1 Gbps, and 10 Gbps data rates over twisted-pair copper cabling. Accordingly, as data rates increase due to widespread deployment of 1 Gbps and 10 Gbps Ethernet switches, fast IP address lookups have become indispensable for core and edge routers. Meanwhile, the number of prefixes in core routers has experienced explosive growth. Earlier solutions to IP address lookups were tries-based through software execution to match an IP address progressively a few bits at a time. In this regard, prefixes were stored in a tree-like data structure to support longest prefix matching (LPM), which chooses the longest prefix among those which match the given IP address.

In contrast, hash tables offer an attractive method for fast IP lookups because of their constant-time search latencies. Hash tables are also attractive because they can be implemented in regular SRAM. SRAM is less expensive, more energy efficient, and exhibits higher densities than TCAM. However, hash tables cannot record entries having "don't care" bits, and data collisions may occur in hash tables. Accordingly, it would be less efficient to use hash tables only while performing IP lookups.

BRIEF SUMMARY OF THE INVENTION

A detailed description is given in the following embodiments with reference to the accompanying drawings.

A network device is provided. The network device includes: a hash memory having a plurality of hash tables, wherein each hash table includes a plurality of entries, and each entry in each hash table has a signature field, and a key field; and a controller, configured to map a search key to a plurality of entries of the hash tables and perform longest prefix matching (LPM) on the search key based on the signature field and the key field of each mapped entry in the hash tables.

A method for looking up data for use in a network device is provided. The method includes the steps of: providing a hash memory comprising a plurality of hash tables, wherein each hash table comprises a plurality of entries, and each entry in each hash table has a signature field, and a key field; mapping a search key to a plurality of entries of the hash tables; and performing longest prefix matching (LPM) on the search key based on the signature field and the key field of each mapped entry in the hash tables.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The description is made for the purpose of illustrating the general principles of the invention and should not be taken in a limiting sense. The scope of the invention is best determined by reference to the appended claims.

Figure 1:
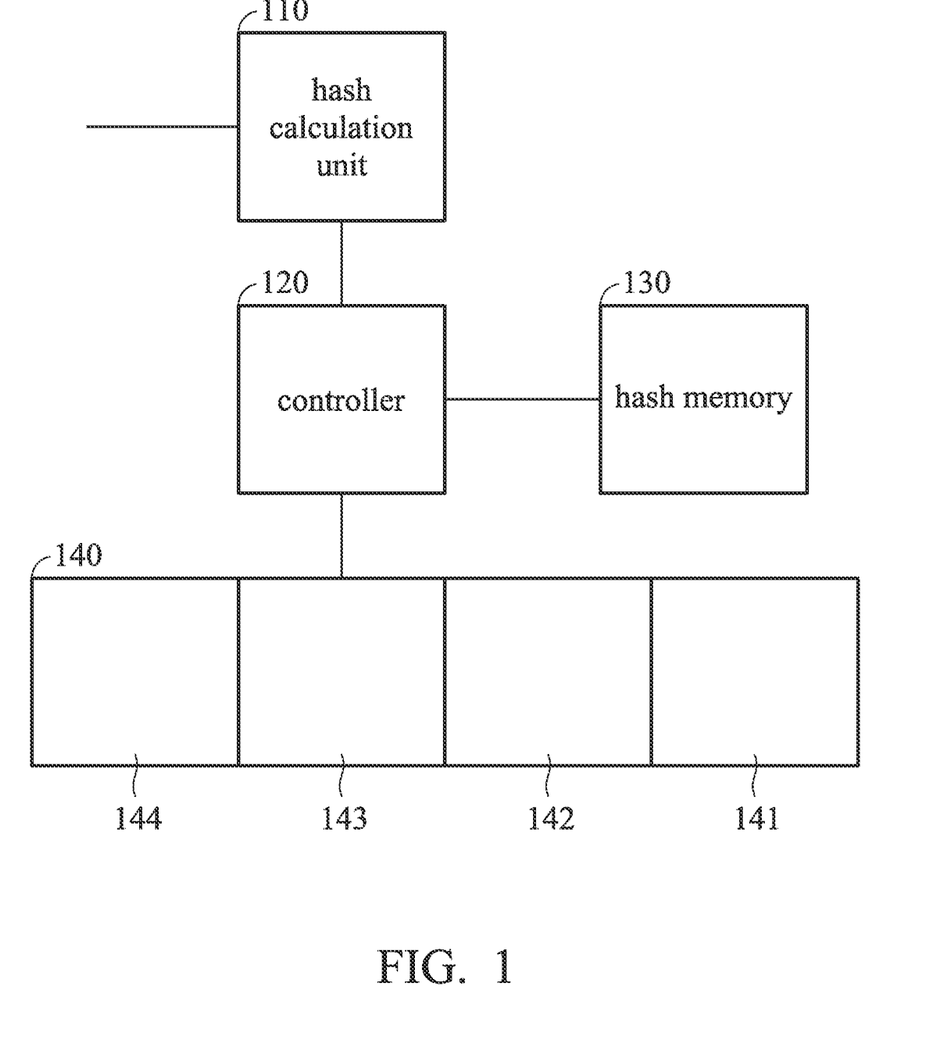
FIG. 1 is a block diagram of a network device in accordance with an embodiment of the invention.

FIG. 1 is a block diagram of a network device in accordance with an embodiment of the invention. The network device 100 may comprise a hash calculation unit 110, a controller 120, a hash memory 130, and a ternary content addressable memory (TCAM) 140. The hash calculation unit 110 implements a hash function that converts a MAC address or an IP address to an associated longest prefix matching (LPM) hash code in the hash memory 130. For example, the hash calculation unit 110 may be implemented by a microcontroller, a processor or an integrated circuit. The hash memory 130 includes a plurality of hash tables which support the majority of all prefixes in a network packet, and the length of the hash key is configurable. In addition, the matching length of each hash entry is also configurable. Since the length of the prefix of a network packet may be statistically located on some specific length, and thus prefixes having the same length can be stored in the same hash table. The controller 120 may look-up data in the hash memory 130 and the TCAM 140. The TCAM 140 may store the entries with prefixes having collision in the hash memory 130 or prefixes which are not supported by the hash tables in the hash memory 130.

In an embodiment, when the hash calculation unit 110 receives the MAC address, the controller 120 may firstly look up the hash memory 130 based on the hash code from the hash calculation unit 110. If the hash operation "hits" at least one entry of the hash memory 130, the controller 120 may report the "hit" result and the length of the entry. If a miss occurs in the hash memory 130, the controller 120 may then enable the TCAM 140 for subsequent data searching. Preferably, the TCAM 140 may be divided into a plurality of memory banks such as memory banks 141~144, and each memory bank may record entries having a length within a specific range. For example, the memory bank 144 may record entries having lengths from 0 bits to 8 bits. The memory bank 143 may record entries having lengths from 9 bits to 16 bits. The memory bank 142 may record entries having lengths from 17 bits to 24 bits. Finally, the memory bank 141 may record entries having lengths more than 24 bits. It should be noted that the lengths of the entries recorded by each memory bank can be adjusted based on practical conditions. Preferably, the entries in the memory banks 141~144 of the TCAM 140 are designed to cover the prefixes with different.

Figure 2:
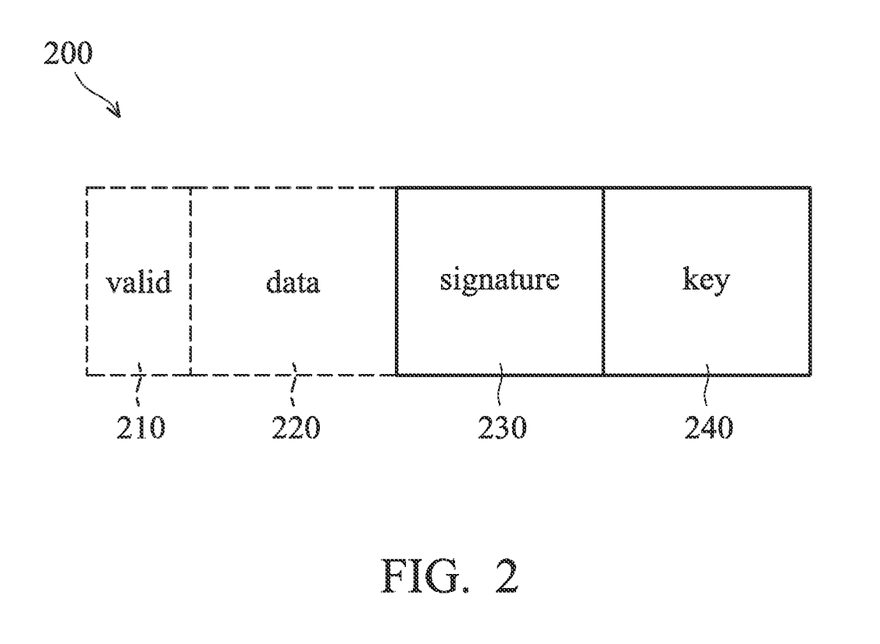
FIG. 2 is a diagram of the format of a hash entry in accordance with an embodiment of the invention.

FIG. 2 is a diagram of the format of a hash entry 200 in accordance with an embodiment of the invention. The hash entry 200 may include a signature field 230, and a key field 240. For example, the signature field 230 may denote different flags such as length, priority, or don't care mask. The key field 240 denotes the data for comparison in the entry lookup procedure in the hash memory 130 and/or the TCAM 140, which may be an IP address. Alternatively, the hash entry 200 may further include a valid field 210 and a data field 220. The valid field 210 indicates whether the hash entry 200 is valid or not. The data field 220 indicates associated data of the hash entry 200, such as an output port number or a specific operation.

For example, when the signature field 230 denotes "length", the entry 200 includes the length information (e.g. from the most significant bit of the data) to support the LPM function. When the signature field 230 denotes the "priority" of an entry and multiple entries are searched, the entry having the highest priority will be chosen as the lookup result. When the signature field 230 denotes "don't care mask", each bit of the data in the data field 220 may have a corresponding mask bit in the signature field 230. For example, when the most significant bit in the signature field is "1", the corresponding most significant bit in the data field 240 will be ignored when performing data comparison between the masked hash key and the data in the data field 220. When the most significant bit in the signature field 230 is "0", the corresponding most significant bit in the data field 240 is unmasked. One having ordinary skill in the art will appreciate that the implementation of the mask bit in the signature field 230 and the corresponding bit in the data field 240 the invention is not limited to the aforementioned embodiment.

In this embodiment, referring to both FIG. 1 and FIG. 2, when the controller 120 is unable to find the data in the hash memory 130, the controller 120 may then go on searching for entries in the TCAM 140. When the controller 120 is able to find the data in the hash memory, the subsequent searching in the TCAM 140 aims for the entries having a longer length. For example, when a 24-bit entry is hit in the hash memory 130 (e.g. a first search result), the subsequent searching is performed on the memory bank(s) recording entries with lengths more than 24 bits (e.g. memory bank 141 in the example). When the subsequent search in the memory bank(s) of the TCAM 140 does not hit any entry, the LPM result from the hash memory 130 is determined as the final LPM result. When the subsequent searching in the memory bank(s) of the TCAM 140 hits an entry (e.g. a second search result), the final LPM result will be determined from the data of the searched entry from the TCAM 140 or from the hash memory 130 based on the length or the priority recorded in the signature field 230 of the search entries. That is, the searched entry having a higher priority or a longer length will be selected as the final LPM result.

Figure 3:
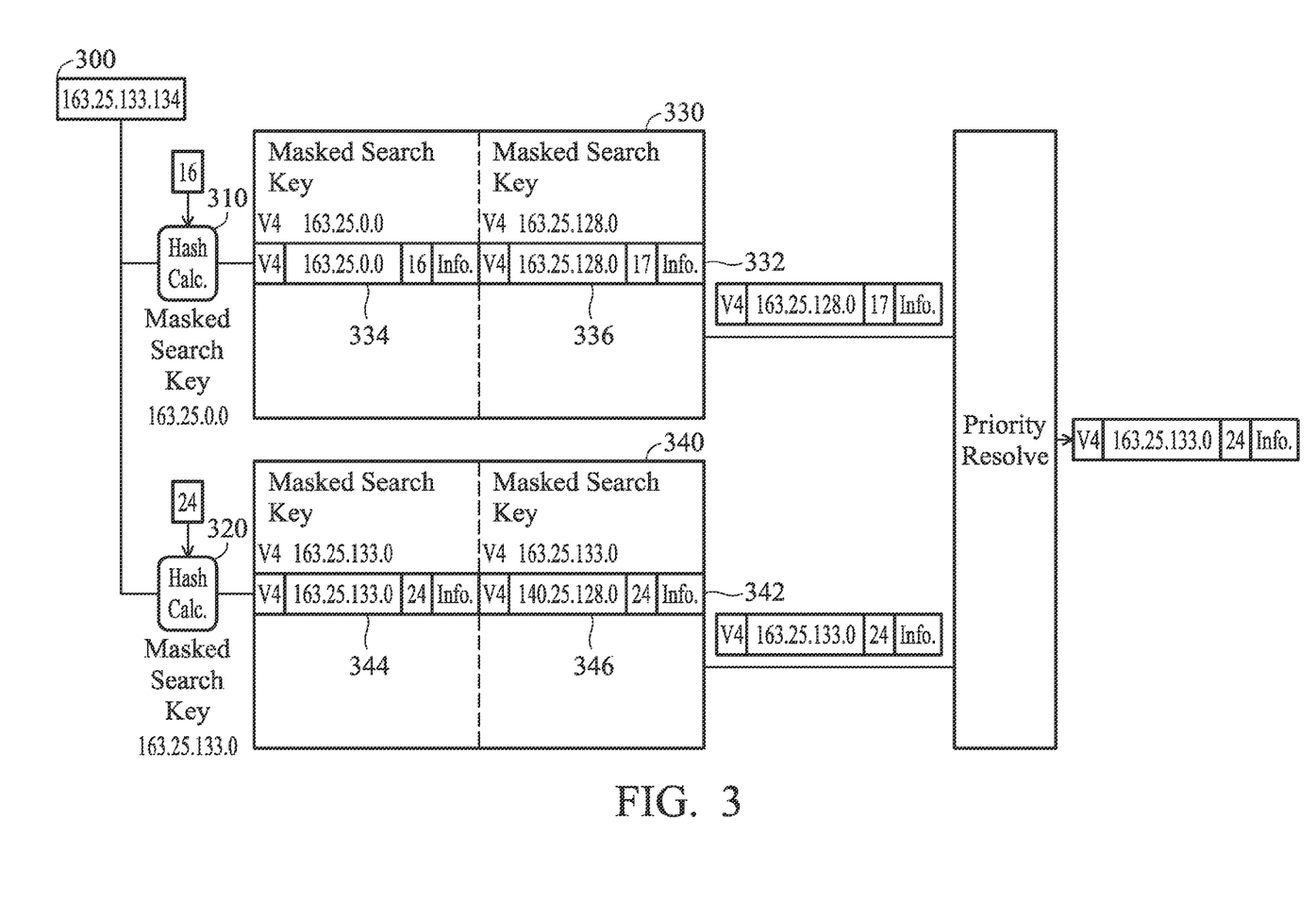
FIG. 3 is a diagram illustrating the search operation in the hash memory when performing LPM in accordance with an embodiment of the invention.

FIG. 3 is a diagram illustrating the searching operation in the hash memory when performing LPM in accordance with an embodiment of the invention. The 32-bit search key 300 denotes an IP address "163.25.133.134". A first masked search key "163.25.0.0" is obtained from the input IP packet 300 by the hash calculation unit 310 using a 16-bit mask, and a second masked search key "163.25.133.0" is obtained by the hash calculation unit 320 using a 24-bit mask. The first masked search key is further used to search for the entries in the hash table 330, and the second masked search key is further used to search for the entries in the hash table 340. For example, when the hash calculation unit 310 determines the first masked search key, the bucket 332 in the hash table 330 is selected. Similarly, when the hash calculation unit 320 determines the second masked search key, the bucket 342 in the hash table 340 is selected.

In addition, there are two slots 334 and 336 in the same bucket 332 in the hash table 330, and two entries in the slots 334 and 336 have different values of 16 and 17 in the signature field which denotes the length for performing LPM. The controller 120 will compare the 16-bit masked search key "163.25.0.0" with the data "163.25.0.0" in the key field of the slot 334, and compare the 17-bit masked search key "163.25.128.0" with the data "163.25.128.0" in the key field of the slot 336. However, the controller 120 may determine that the comparison results in the slots 334 and 336 are both "hit". Afterwards, the controller 120 may select the entry stored in the slot 336 as the lookup result of the hash table 330 since the length for data comparison in the slot 336 is longer than that in the slot 334.

Similarly, there are two slots 344 and 346 in the same bucket 342 in the hash table 340, and two entries in the slots 344 and 346 have the same value of 24 in the signature field which denotes the length for performing LPM. The controller 120 will compare the 24-bit masked key "163.25.133.0" with the data "163.25.133.0" in the key field of the slot 344, and compare the 24-bit masked search key "163.25.133.0" with the data "140.25.128.0" in the data field of the slot 346. Afterwards, the controller 120 may determine that only the comparison result in the slot 344 is "hit" because the 24-bit masked search key "163.25.133.0" matches the data "163.25.133.0" in the key field of the slot 344. The controller 120 may select the entry stored in the slot 344 as the lookup result of the hash table 340.

It should be noted that the first masked hash key "163.25.0.0" and the second masked hash key "163.25.133.0" are applied to calculate hash values and determine which bucket should be chosen in hash tables 330 and 340, respectively. When performing LPM, the data length for comparison is determined by the length value in the signature field of each slot in the selected buckets in the hash tables 330 and 340. For simplicity, the search key, the masked hash keys, the masked search keys, and data in the key field in each entry in the aforementioned embodiments are in the IPv4 format, but the invention is not limited thereto. For example, the prefix lengths of the search key (e.g. an IP address) are 32 bits and 128 bits for an IPv4 address and an IPv6 address, respectively.

Additionally, the controller 120 may further determine which lookup result should be chosen from the hash tables 330 and 340. Since the data comparison length in the hash table 340 is longer than that in the hash table 330, the controller 120 may determine the lookup result from the hash table 340 as the final LPM result. That is, the lookup result having a higher priority will be chosen by the controller 120.

Figure 4A:
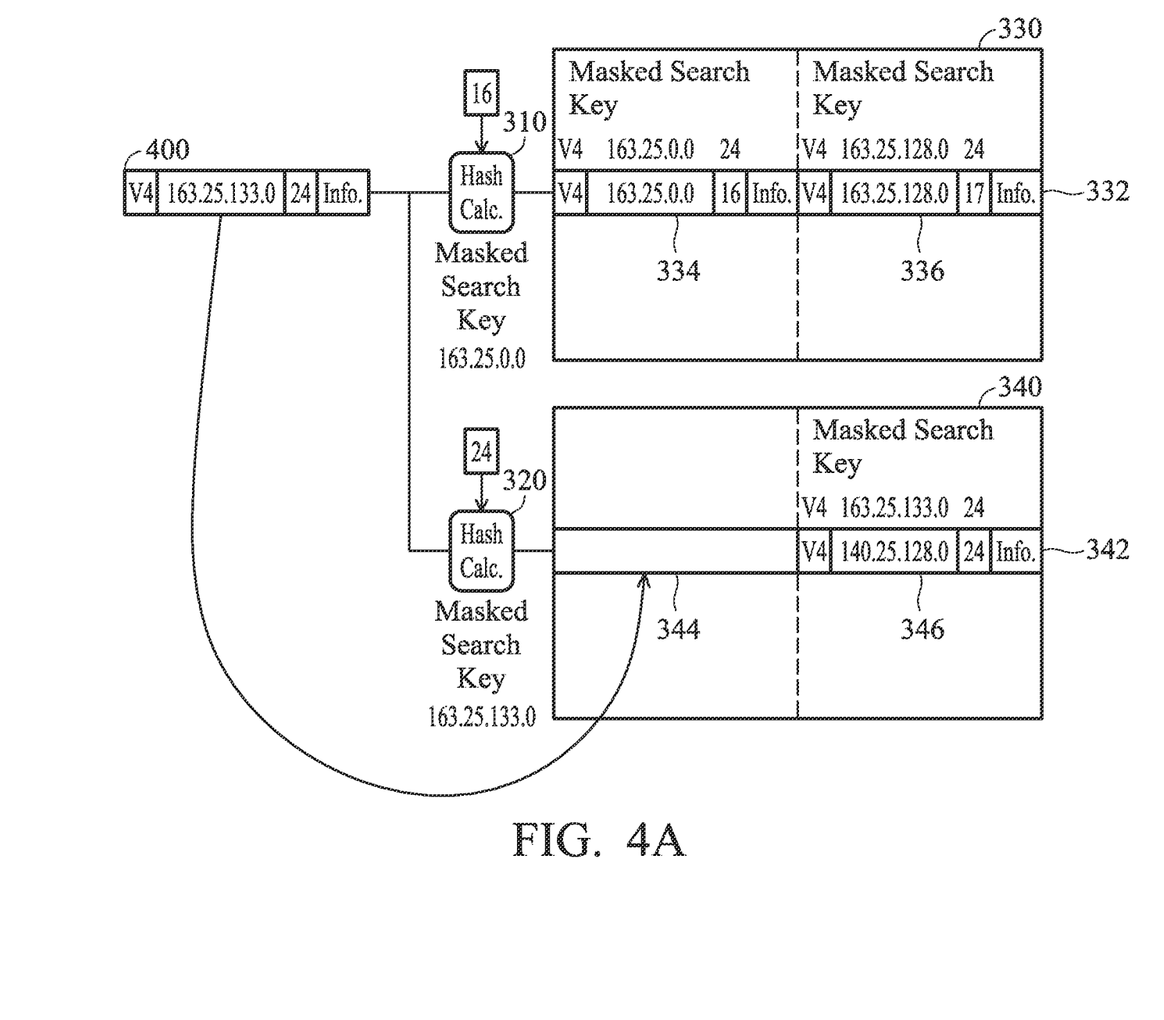
FIG. 4A is a diagram illustrating the insertion operation in the hash memory when performing LPM in accordance with an embodiment of the invention.

FIG. 4A is a diagram illustrating the insertion operation in the hash memory when performing LPM in accordance with an embodiment of the invention. When building entries in the hash tables in the hash memory 130, the controller 120 may determine whether an incoming entry 400 has been recorded in the hash tables. For example, the slots 334 and 336 in the bucket 332 in the hash table 330 have been filled with different entries. When the incoming entry 400 is to be inserted into one of the hash tables 330 and 340, the hash calculation units 310 and 320 still calculate the first masked hash key and the second masked hash key mapping to the hash tables 330 and 340, respectively. The details of hashing can be referred to in the embodiment of FIG. 3. Afterwards, the controller 120 may compare the incoming entry 400 with the entries in the non-empty slots 334, 336, and 346. The controller 120 may determine whether any of the key fields in the slots 334, 336, and 346 matches a corresponding masked search key. For example, the masked key field of the inserted entry for matching the key field in the slot 334 is "163.25.0.0", and the masked key field of the inserted entry for matching the key field in the slot 336 is "163.25.128.0". As shown in FIG. 4A, the key field in the slot 334 is "163.25.0.0" which is identical to the masked key field of the inserted entry "163.25.0.0". However, the controller 120 still determines that the incoming entry does not match the entry in the slot 334 because the prefix length values recorded in the signature field of the two entries are different. Similarly, the controller 120 determines that the incoming entry does not match the entries in the slots 336 and 346. That is, the incoming entry is not recorded in the hash tables 330 and 340, and the incoming entry can be recorded into an empty slot in one of the mapped bucket, e.g. bucket 344 in the example.

Figure 4B:
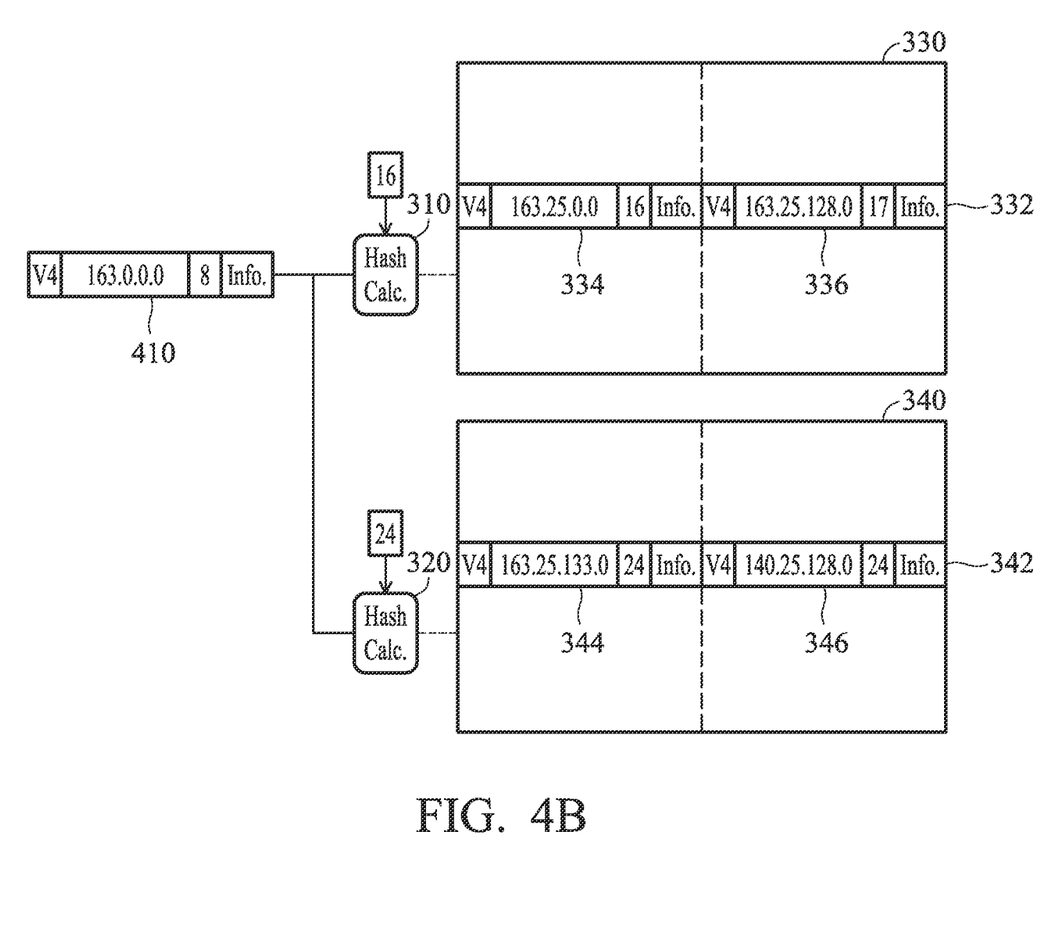
FIG. 4B is a diagram illustrating the insertion operation in the hash memory when performing LPM in accordance with another embodiment of the invention.

FIG. 4B is a diagram illustrating the insertion operation in the hash memory when performing LPM in accordance with another embodiment of the invention. The insertion operations in FIG. 4B are similar to those in FIG. 4A. The difference between FIG. 4B and FIG. 4A is that the slots 334, 336, 344, and 346 in the mapped buckets 332 and 342 in FIG. 4B are all filled with entries. However, the signature field in the incoming entry 410 records a length of 8 bits, and the hash calculation units 310 and 320 will not calculate hash code of the incoming entry because the entry length to be compared is less than the mask size of the hash calculation units 310 and 320. Accordingly, the controller 120 may determine that the insertion operation of the incoming entry 410 is failed. In addition, the controller 120 may store the incoming entry into the TCAM 140 for subsequent look-up operations.

Figure 5:
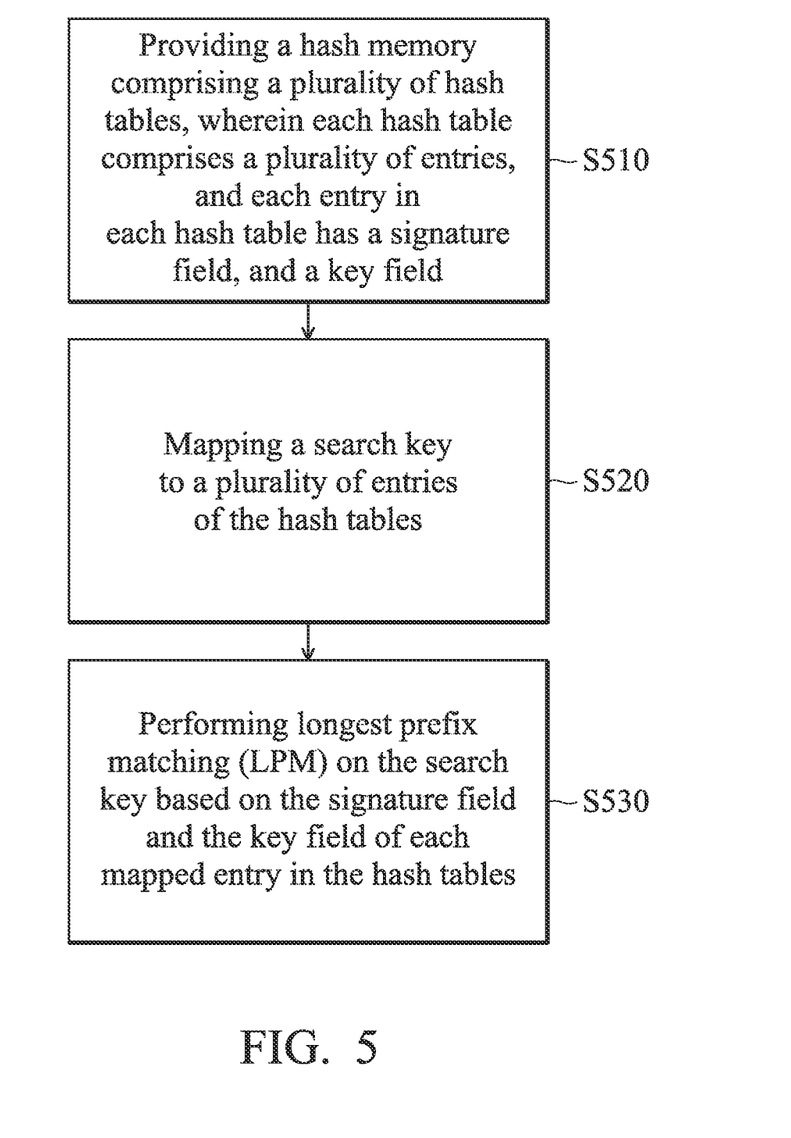
FIG. 5 is a flow chart of a method for searching data in the network device in accordance with an embodiment of the invention.

FIG. 5 is a flow chart of a method for searching data in the network device in accordance with an embodiment of the invention. In step S510, a hash memory comprising a plurality of hash tables is provided, wherein each hash table comprises a plurality of entries, and each entry in each hash table has a signature field, and a key field. In step S520, a search key is mapped to one of the entry of the hash tables. In step S530, longest prefix matching (LPM) is performed on the search key based on the signature field of the entry in the mapped hash table.

While the invention has been described by way of example and in terms of the preferred embodiments, it is to be understood that the invention is not limited to the disclosed embodiments. On the contrary, it is intended to cover various modifications and similar arrangements without departing from the spirit of this invention. Therefore, the scope of the appended claims should be accorded the broadest interpretation so as to encompass all such modifications and similar arrangements.

What is claimed is:

1. A network device, comprising:
a hash memory comprising a plurality of hash tables, wherein each hash table comprises a plurality of entries, and each entry in each hash table comprises a signature field and a key field;
a controller, configured to map a search key to a plurality of entries of the hash tables, and perform longest prefix matching (LPM) on the search key based on the signature field and the key field of each mapped entry in the hash tables; and
a plurality of hash calculation units, each for calculating a masked search key with a respective predetermined mask length,
wherein the controller locates the mapped entries of the hash tables based on the masked search key from each hash calculation unit.

2. The network device as claimed in claim 1, wherein the signature field denotes a prefix length of each entry in the hash tables.

3. The network device as claimed in claim 1, wherein the signature field denotes a priority of each entry in the hash tables.

4. The network device as claimed in claim 1, wherein the signature field denotes mask bits for masking corresponding bits of the search key.

5. The network device as claimed in claim 1, wherein each entry in each hash table further comprises a valid field indicating whether each entry is valid or not.

6. The network device as claimed in claim 1, further comprising:
a ternary content addressable memory (TCAM), comprising a plurality of memory banks, wherein each memory bank records entries having a length within a specific range.

7. The network device as claimed in claim 6, wherein when no search result for LPM is obtained from the mapped hash table, the controller further looks up the search key in the TCAM.

8. The network device as claimed in claim 6, wherein when a first search result for LPM is obtained from the hash tables, the controller further looks-up the search key in one or more of the memory banks of the TCAM based on the length of the first search result,
wherein when a second search result for LPM is obtained from the TCAM, the memory further determines that the first search result or the second search result is the LPM result based on the signature fields of the first search result and the second search result.

9. The network device as claimed in claim 6, wherein the controller further compares the masked search key with data in the key field, and the controller further selects the data in the key field when the masked search key matches the data in the key field.

10. The network device as claimed in claim 1, wherein the search key is an IP address or a MAC address.

11. The network device as claimed in claim 1, wherein the each entry in each hash table further comprises a data field, which indicates an output port number or a specific operation of each entry.

12. A method for looking-up data for use in a network device, the method comprising:
providing a hash memory comprising a plurality of hash tables, wherein each hash table comprises a plurality of entries, and each entry in each hash table has a signature field and a key field; and
mapping a search key to a plurality of entries of the hash tables;
calculating a plurality of masked search keys, each calculated with a respective predetermined mask length;
obtaining the mapped hash table based on the masked search keys; and
performing longest prefix matching (LPM) on the masked search key based on the signature field and the key field of each mapped entry in the hash tables.

13. The method as claimed in claim 12, wherein the signature field denotes a prefix length of each entry in the hash tables.

14. The method as claimed in claim 12, wherein the signature field denotes priority of each entry in the hash tables.

15. The method as claimed in claim 12, wherein the signature field denotes mask bits for masking corresponding bits of the search key.

16. The method as claimed in claim 12, wherein each entry in each hash table further comprises a valid field indicating whether said each entry is valid or not.

17. The method as claimed in claim 12, further comprising:
storing entries with prefixes having collision in the hash tables or prefixes which are not supported by the hash tables into a ternary content addressable memory (TCAM) of the network device.

18. The method as claimed in claim 17, further comprising:
looking up the search key in the TCAM when no search result for LPM is obtained from the mapped hash table.

19. The method as claimed in claim 17, further comprising:
providing a second search result by looking up the search key in the TCAM based on the length of a first search result when the first search result for LPM is obtained from the mapped hash table; and
determining that the first search result or the second search result is the LPM result based on the signature fields of the first search result and the second search result when the second search result for LPM is obtained from the TCAM.

20. The method as claimed in claim 17, further comprising:
performing LPM between the masked search key and data in the key field; and
selecting the data in the key field when the masked search key matches the data in the key field.

21. The method as claimed in claim 12, wherein the search key is an IP address or a MAC address.

22. The method as claimed in claim 12, wherein the each entry in each hash table further comprises a data field, which indicates an output port number or a specific operation of each entry.

* * * * *